Figure 1:
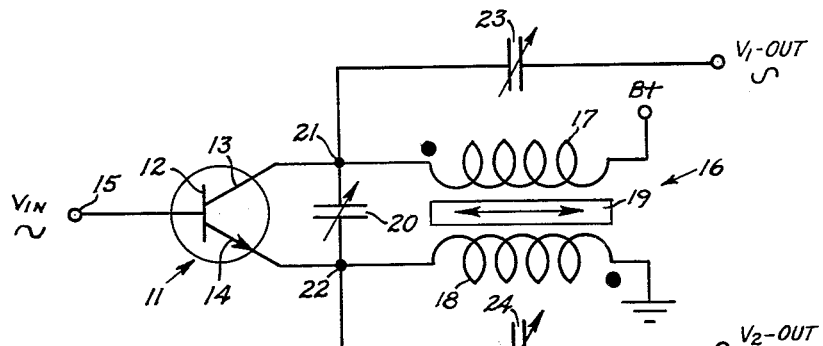

Oct. 27, 1964 C. E. DAVID ETAL 3,154,750

HIGH FREQUENCY PHASE SPLITTER UTILIZING BIFILAR WINDINGS

Filed April 28, 1961

INVENTORS:
CHARLES E. DAVID
ROBERT L. HAYNES
BY
H. H. Loeb
Paul S. Collignon
ATTORNEYS

United States Patent Office 3,154,750
Patented Oct. 27, 1964

3,154,750
HIGH FREQUENCY PHASE SPLITTER UTILIZING BIFILAR WINDINGS
Charles E. David and Robert L. Haynes, Indianapolis, Ind., assignors to the United States of America as represented by the Secretary of the Navy
Filed Apr. 28, 1961, Ser. No. 106,415
4 Claims. (Cl. 330—14)
(Granted under Title 35, U.S. Code (1952), sec. 266)

The invention described herein may be manufactured and used by or for the Government of the United States of America for governmental purposes without the payment of any royalties thereon or therefor.

The present invention relates to a high frequency phase inverter, and more particularly to a phase inverter which provides two voltages equal in magnitude and opposite in phase.

Various devices have heretofore been used as phase inverters. One device commonly used in tube and transistor amplifiers employs an interstage coupling transformer having a symmetrical center-tapped secondary winding. However, this type of device has a disadvantage in that it is very difficult to obtain balanced output voltages from the secondary windings, particularly at high frequencies. It is the distributed capacitance between the primary and secondary windings that causes this unbalance. If the interstage transformer is built so that the distributed capacitance is small, it becomes difficult and expensive to build. Also, it is very difficult to adjust the outputs so that they will be closely balanced.

Another heretofore known device provides two conventional transistors coupled together in a two-stage circuit wherein the first stage serves the functions of impedance matching and on and off control for the second stage which provides power to the load. The disadvantage of this two-stage circuit is that there are a multiple number of parts required and consequently, the circuit is expensive to build.

The present invention overcomes the disadvantages of heretofore known phase inverter circuits by providing a bifilar wound transformer that is connected to a single transistor. By definition, a bifilar wound transformer is one that has a winding consisting of two insulated wires wound side by side, with current traveling through the wires in opposite directions. One winding of the transformer is connected in circuit with the collector of the transistor, and the other winding is connected so that negative feedback is provided to the emitter of the transistor. One output, which is connected to the emitter, will have the same polarity as the input, which is applied to base electrode of the transistor, and the output which is connected to the collector will have the opposite polarity as that applied to the base electrode. As the distributed capacitance between the bifilar windings is approximately the same at both ends, any degrading of the input signal is in the same amount to both outputs. Thus the outputs are very nearly balanced.

It is therefore a general object of the present invention to provide an improved phase inverter circuit for use at high frequencies.

Another object of the present invention is to provide a circuit that will provide balanced outputs that are opposite in phase.

Still another object of the present invention is to provide a phase inverter circuit that is inexpensive to build.

A further object of the present invention is to provide a transistorized phase inverter that is readily aligned when installed.

Figure 2:
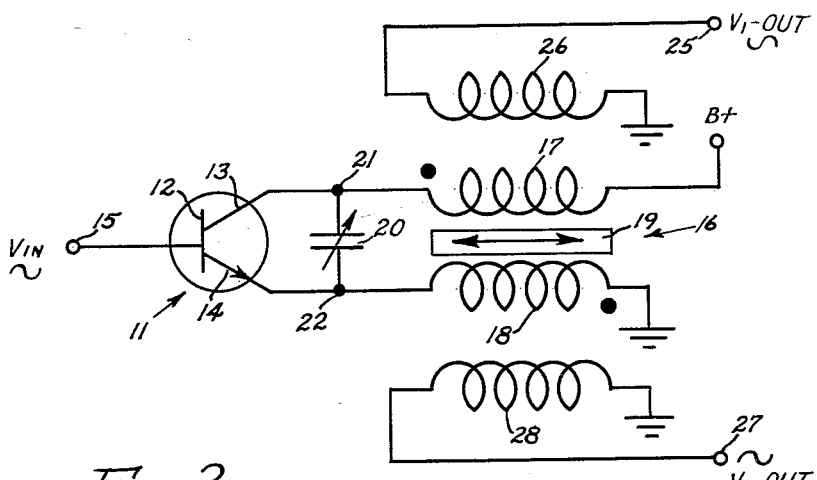

Other objects and advantages of the present invention will be readily appreciated as the same becomes better understood by reference to the following detailed description when considered in connection with the accompanying drawing wherein:

FIG. 1 is schematic diagram showing a first embodiment of the new and improved circuit arrangement of the present invention; and FIG. 2 is a schematic diagram showing a second embodiment of the present invention.

Referring now to the drawing, wherein like reference characters designate like or corresponding parts throughout the several views, there is shown in FIG. 1, a phase inverter circuit comprising a transistor 11 having a base electrode 12, collector electrode 13, and emitter electrode 14. Base electrode 12 is connected to input terminal 15, to which is applied a voltage signal. A bifilar wound transformer 16, having a turns ratio of 1 to 1, is provided, with one lead of winding 17 being connected to the collector electrode 13 and one lead of winding 18 being connected to emitter 14. The other lead of winding 17 is connected to a voltage source (B+), and the other lead of winding 18 is connected to ground. A movable core 19 made, for example, from powdered iron is positioned within windings 17 and 18.

A variable capacitor 20 is connected between junction points 21 and 22. Junction point 21 is common to the collector electrode 13 and one end of winding 17, while junction point 22 is common to the emitter electrode 14 and one end of winding 18.

In operation, the high frequency signal voltage, which might be in the region of 60 megacycles, is applied to input terminal 15, and the base electrode 12 is thus connected directly to the high frequency signal voltage. As the collector electrode 13 is connected to a positive voltage source and the emitter electrode 14 is connected to ground, the voltage at junction point 21 will be inverted and the voltage at junction point 22 will be in-phase, with respect to the input voltage. As the winding 18 is connected between ground and the emitter 14, negative feedback is provided at the emitter. As the distributed capacitance between windings 17 and 18 is approximately the same at both ends of the bifilar wound transformer 16, which due to being bifilar wound must of necessity have a turns ratio of 1:1, any degrading of the input voltage signal will be the same for both outputs which results in outputs that are very nearly balanced. Capacitors 23 and 24 provide any fine adjustments necessary to balance the amplitudes of the out-of-phase output signal voltages $V_1$ and $V_2$ by varying the coupling to the following stage, and movable core 19 of bifilar wound transformer 16 and adjustable capacitor 20 are provided to adjust the tuning or band pass region of the circuit.

Upon application of a high frequency signal voltage to input terminal 15 of the embodiment shown in FIGURE 1, the voltage appearing at terminal 22 via emitter electrode 14 will "follow" or be of the same phase as the applied signal voltage while the voltage appearing at terminal 21 via collector electrode 13 will be 180 degrees out-of-phase with this applied voltage, due to the conduction of transistor 11, i.e. arise in potential at the base electrode of transistor 11 causes a corresponding rise in potential at emitter electrode 14 and a decrease in potential at collector electrode 13. Transformer 16, having bifilar windings 17 and 18, and thus necessarily a 1:1 turns ratio, places equal impedances in the collector and emitter circuits of transistor 11. These equal impedances, which by virtue of their bifilar winding have very nearly equal distributed capacitance therebetween, cause the out-of-phase voltages produced at therminals 21 and 22 to be very nearly balanced in amplitude. Any slight unbalance may be corrected by adjustment of coupling capacitors 23 and 24 to provide balanced, oppositely phased voltages $V_1$ and $V_2$. Movable core 19 of bifilar transformer 16 in conjunction with adjustable capacitor 20 are utilized for tuning the circuit to the desired pass band of frequencies.

In the embodiment shown in FIG. 2 of the drawing, output terminal 25 is effectively connected to junction point 21 through the close inductive coupling of windings 17 and 26, and likewise, output terminal 27 is effectively connected to junction point 22 through the close inductive coupling of windings 18 and 28.

From the above detailed description, it can be seen that there has been provided an improved transistorized inverter circuit that will provide first and second outputs that are balanced and opposite in phase. The circuit of the present invention is particularly useful where the input voltage source is one of very high frequency, for example, in the range of 45–60 megacycles.

While the invention has been shown as using an N–P–N type transistor for purposes of illustration, it will be understood by those persons skilled in the art that the invention is applicable to circuits utilizing a P–N–P transistor. It is only a matter of reversing voltage polarities.

Obviously many modifications and variations of the present invention are possible in the light of the above teachings. It is therefore to be understood, that within the scope of the appended claims, the invention may be practiced otherwise than as specifically described.

What is claimed is:

1. A high frequency inverter circuit comprising: a transistor having emitter, collector, and base electrodes, an input terminal connected to said base electrode, an input signal supplied to said input terminal, a bifilar wound transformer having first and second windings with a ratio of one to one, said first winding being connected between a D.C. power source and said collector electrode and said second winding being connected between ground potential and said emitter electrode, and first and second output terminals, said first output terminal being connected, via adjustable capacitance means, between one end of said first winding and said collector electrode and said second output terminal being connected, via adjustable capacitance means, between one end of said second winding and said emitter electrode, whereby the output signal at said first output terminal is inverted with respect to said input signal supplied to said input terminal.

2. A high frequency inverter circuit comprising: a transistor having emitter, collector, and base electrodes, signal input means connected to said base electrode, a bifilar wound transformer having first and second windings with a turns ratio of one to one, said first winding being connected between a D.C. power source and said collector electrode and said second winding being connected between ground potential and said emitter electrode, an adjustable capacitor connected across said collector and emitter electrodes, and first and second output terminals, said first output terminal being connected, via adjustable capacitance means, between one end of said first winding and said collector electrode and said second output terminal being connected, via adjustable capacitance means, between one end of said second winding and said emitter electrode.

3. A high frequency inverter circuit comprising: a transistor having emitter, collector, and base electrodes, an input terminal connected to said base electrode, an input signal supplied to said input terminal, a bifilar wound transformer having an adjustable metallic core and having first and second windings with a turns ratio of one to one, said first winding being connected between a D.C. power source and said collector electrode and said second winding being connected between ground potential and said emitter electrode, an adjustable capacitor connected across said collector and emitter electrodes, and first and second output terminals, said first output terminal being connected through an adjustable capacitor to a junction point common to one end of said first winding and said collector electrode, and said second output terminal being connected through an adjustable capacitor to a junction point common to one end of said second winding and said emitter electrode, whereby the output signal at said first output terminal is inverted with respect to said input signal supplied to said input terminal.

4. A high frequency inverter circuit comprising: a transistor having emitter, collector, and base electrodes; an input terminal connected to said base electrode; an input signal supplied to said input terminal; an adjustable capacitor coupled between said emitter electrode and said collector electrode; a bifilar wound transformer having an adjustable metallic core and having first and second windings with a turns ratio of one to one, said first winding being connected between a D.C. power source and said collector electrode and said second winding being connected between ground potential and said emitter electrode; and first and second output terminals, inductively connected to said first and second windings, respectively, whereby the output signal at said first output terminal is inverted and the output signal at said second output terminal is in-phase with respect to said input signal supplied to said input terminal.

References Cited in the file of this patent

UNITED STATES PATENTS

| | | |
|---|---|---|
| 2,147,553 | Schlesinger | Feb. 14, 1939 |
| 2,729,796 | Hulst | Jan. 3, 1956 |
| 2,758,219 | Miller | Aug. 7, 1956 |
| 2,762,874 | Barco | Sept. 11, 1956 |
| 2,860,192 | McIntosh | Nov. 11, 1958 |
| 2,931,988 | Bussard | Apr. 5, 1960 |
| 2,948,869 | Bigelow | Aug. 9, 1960 |
| 3,064,200 | Brown | Nov. 13, 1962 |

FOREIGN PATENTS

| | | |
|---|---|---|
| 867,841 | Great Britain | May 10, 1961 |